(12) United States Patent
Elder

(10) Patent No.: US 8,960,593 B2
(45) Date of Patent: Feb. 24, 2015

(54) HORIZON SCANNING SYSTEM FOR A ROTARY WING AIRCRAFT INCLUDING SENSORS HOUSED WITHIN A TUBERCLE ON A ROTOR BLADE

(75) Inventor: Steven J. Elder, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 967 days.

(21) Appl. No.: 13/100,139

(22) Filed: May 3, 2011

(65) Prior Publication Data

US 2012/0280857 A1 Nov. 8, 2012

(51) Int. Cl.
| | | |
|---|---|---|
| *B64C 27/00* | (2006.01) | |
| *B64C 27/46* | (2006.01) | |
| *B64D 47/08* | (2006.01) | |
| *B64C 27/04* | (2006.01) | |
| *G01S 7/02* | (2006.01) | |

(52) U.S. Cl.
CPC ............... *B64C 27/46* (2013.01); *B64D 47/08* (2013.01); *B64C 27/04* (2013.01); *G01S 2007/027* (2013.01)
USPC ..................................... 244/17.11; 342/25 R

(58) Field of Classification Search
CPC ...... B64C 27/12; B64C 27/04; B64C 27/473; G01S 13/93; G01S 2013/9082; G01S 13/953; H01Q 1/286
USPC ............ 244/17.11, 1 R, 121; 73/170.02, 180; 342/25 R, 25 A
See application file for complete search history.

(56) References Cited

U.S. PATENT DOCUMENTS

| | | | | |
|---|---|---|---|---|
| 3,389,393 | A * | 6/1968 | Young, Jr. ................ | 343/708 |
| 3,390,393 | A * | 6/1968 | Upton ...................... | 343/708 |
| 3,478,353 | A * | 11/1969 | Adams, Jr. ................ | 343/708 |
| 3,754,264 | A | 8/1973 | Blackband | |
| 4,737,788 | A * | 4/1988 | Kennedy ................. | 342/29 |
| 5,014,544 | A * | 5/1991 | West ....................... | 73/40.7 |
| 5,017,922 | A * | 5/1991 | Klausing et al. .......... | 342/25 F |
| 5,614,907 | A * | 3/1997 | Kreitmair-Steck et al. .. | 342/25 F |
| 5,745,085 | A | 4/1998 | Tomio et al. | |
| 6,118,401 | A * | 9/2000 | Tognazzini ............... | 342/29 |
| 7,002,508 | B2 * | 2/2006 | Wolframm et al. ........ | 342/25 R |
| 7,528,762 | B2 * | 5/2009 | Cerwin ................... | 342/22 |
| 7,557,735 | B1 * | 7/2009 | Woodell et al. ........... | 340/968 |

(Continued)

OTHER PUBLICATIONS

Procerus Technologies, TechSheet_BTC-40_Gimbal_04_08_2008. Updated Feb 1, 2006. http://www.lockheedmartin.com/content/dam/lockheed/data/ms2/documents/procerus/TechSheet_BTC-40_Gimbal_04_08_2008.pdf. Accessed Jun. 2, 2014.*

(Continued)

*Primary Examiner* — Benjamin P Lee
*Assistant Examiner* — Alexander V Giczy
(74) *Attorney, Agent, or Firm* — Eric A. Gifford

(57) ABSTRACT

A rotary wing aircraft, a rotor blade and a horizon scanning system are provided. The rotary wing aircraft, for example, may include, but is not limited to, a mast, an engine configured to provide rotational force to the mast and a controller. The rotary wing aircraft may further include a rotor blade connected to the mast having a leading edge, a plurality of tubercles positioned on the leading edge of the rotor blade, and a sensor housed within at least one of the plurality tubercles communicatively connected to the controller.

7 Claims, 5 Drawing Sheets

(56) References Cited

U.S. PATENT DOCUMENTS

| | | | |
|---|---|---|---|
| 2004/0239550 A1* | 12/2004 | Daly, Jr. | 342/26 B |
| 2006/0049302 A1* | 3/2006 | Kennedy et al. | 244/17.11 |
| 2006/0060721 A1* | 3/2006 | Watts et al. | 244/200 |
| 2007/0063898 A1* | 3/2007 | Phelan et al. | 343/700 MS |
| 2009/0074578 A1 | 3/2009 | Dewar et al. | |
| 2010/0073664 A1* | 3/2010 | Krasutsky | 356/4.01 |
| 2010/0094508 A1* | 4/2010 | Kozyreff et al. | 701/45 |
| 2010/0141503 A1* | 6/2010 | Baumatz | 342/27 |

OTHER PUBLICATIONS

BCT-40 Ball Turret Camera Specifications. Archived on Oct. 23, 2007 at https://web.archive.org/web/20071023025349/http://microuav.com/camera40.html. Accessed Jun. 4, 2014.*

* cited by examiner

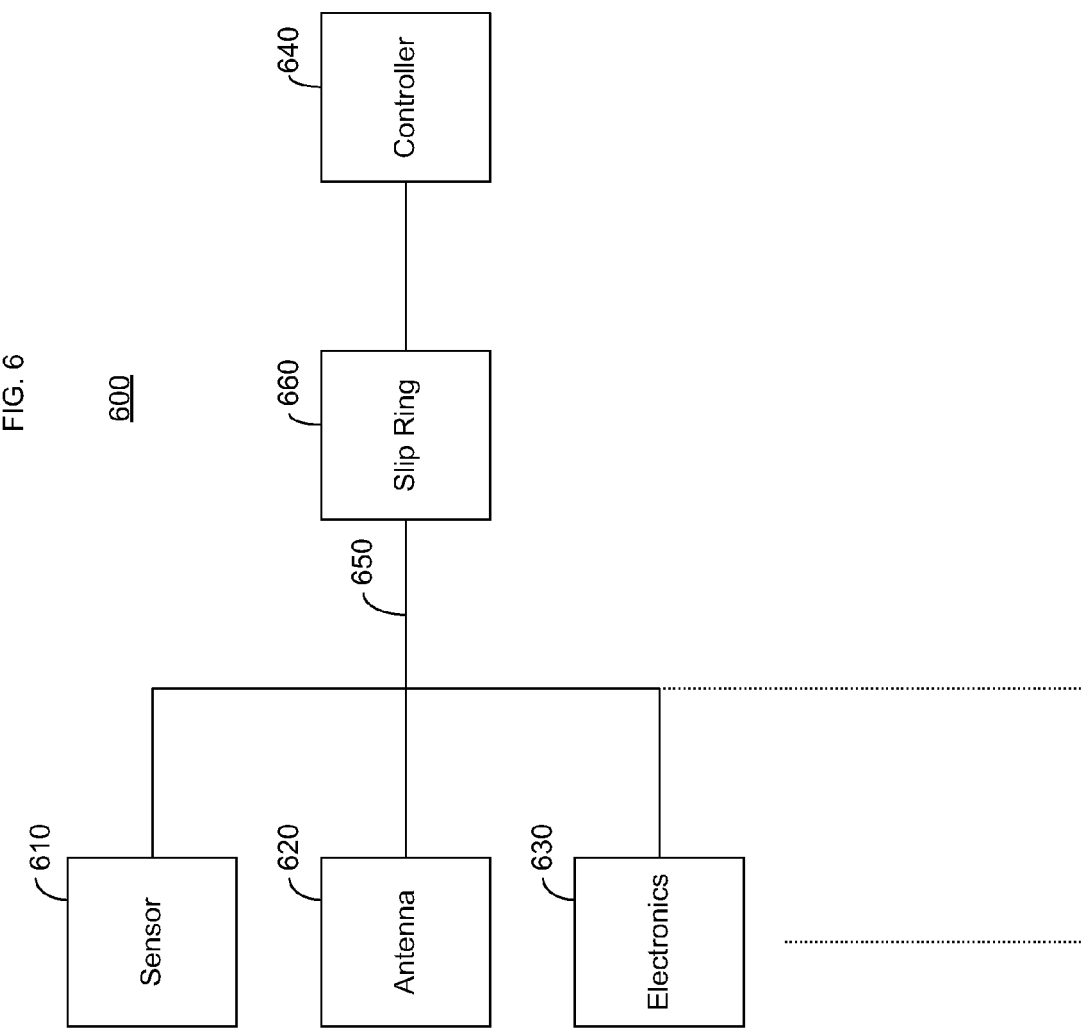

HORIZON SCANNING SYSTEM FOR A ROTARY WING AIRCRAFT INCLUDING SENSORS HOUSED WITHIN A TUBERCLE ON A ROTOR BLADE

TECHNICAL FIELD

Embodiments of the subject matter described herein relate generally to horizon scanning systems on a rotary wing aircraft, and more particularly to using housing sensors, antennae and support electronics in tubercles positioned on a leading edge of the rotors of the rotary wing aircraft.

BACKGROUND

Currently, horizon scanning is performed by aircraft having airborne early warning and control (AEWC) systems, which are also known as airborne warning and control systems (AWACs). The aircraft are expensive to build, maintain and repair. Furthermore, the AEWC system is typically mounted on the top of the aircraft. Accordingly, the aircraft body, which is typically quite large, blocks a large portion of the sky, preventing the AEWC system from detecting objects or weather conditions in the aircraft's shadow.

Accordingly, there is a need for improved horizon scanning systems. Other desirable features and characteristics will become apparent from the subsequent detailed description and the appended claims, taken in conjunction with the accompanying drawings and the foregoing technical field and background.

BRIEF SUMMARY

In accordance with one embodiment, a rotary wing aircraft is provided. The rotary wing aircraft, for example, may include, but is not limited to, a mast, an engine configured to provide rotational force to the mast and a controller. The rotary wing aircraft may further include a rotor blade connected to the mast having a leading edge, a plurality of tubercles positioned on the leading edge of the rotor blade, and a sensor housed within at least one of the plurality tubercles communicatively connected to the controller.

In accordance with another embodiment, a rotor is provided. The rotor may include, but is not limited to a blade having a leading edge, at least one tubercle positioned on the leading edge, and a sensor housed within at least one of the tubercles.

In accordance with another embodiment a horizon scanning system is provided. The horizon scanning system can include, but is not limited to, a rotary wing aircraft. The rotary wing aircraft may include a vertical mast and at least one rotor blade connected to the vertical mast. Each of the of rotor blades may include a leading edge, at least one tubercle positioned on the leading edge, and a sensor housed within at least one of the tubercles.

BRIEF DESCRIPTION OF THE DRAWINGS

A more complete understanding of the embodiments may be derived by referring to the detailed description and claims when considered in conjunction with the following figures, wherein like reference numbers refer to similar elements throughout the figures.

FIG. 6 is a block diagram of a horizon scanning system in accordance with an embodiment.

DETAILED DESCRIPTION OF THE DRAWINGS

The following discussion generally relates to a rotary wing aircraft, such as a helicopter, having a horizon scanning system. Because a rotary wing aircraft has a smaller body than the aircraft typically used to perform horizon scanning, the horizon scanning system described herein has a smaller blind spot than the current system. As described in further detail below, the sensors, antennae and support electronics for the horizon scanning system are housed in tubercles placed on the leading edge of the rotary blades of the rotary wing aircraft. The following detailed description is merely illustrative in nature and is not intended to limit the embodiments or the application and uses thereof. Furthermore, there is no intention to be bound by any expressed or implied theory presented in the preceding technical field, background, brief summary, or the following detailed description.

Figure 1:
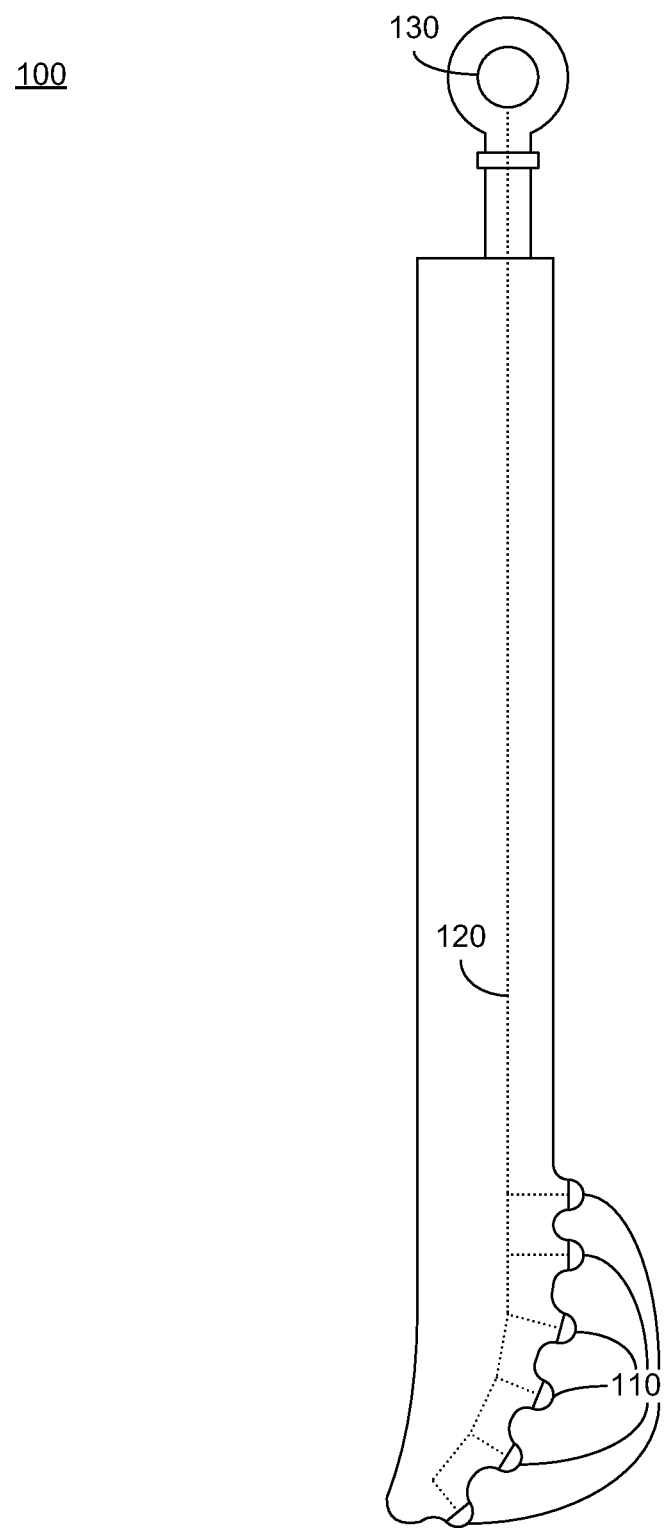
FIG. 1 illustrates an exemplary rotor blade for a rotary wing aircraft in accordance with an embodiment.

FIG. 1 illustrates an exemplary rotor blade 100 for a rotary wing aircraft. The rotor blade can be constructed from a non-conducting material, a conducting material or any combination thereof. For example, the rotor blade 100 can be formed from aluminum alloys, fiberglass sheathed wood or fiber reinforced composites. The rotor blade 100 includes a series of tubercles no on a leading edge of the rotor. While the rotor blade 100 illustrated in FIG. 1 includes six tubercles 110, any number of tubercles 110 may be used. In one embodiment, for example, the tubercles 110 can be placed periodically, that is, each separated by a fixed distance along the rotor blade 100. In other embodiments, the tubercles 110 can be placed in a non-periodic (i.e., aperiodic) fashion. The use of the tubercles 110 on the rotor improves the aerodynamic properties of the rotor. For example, the use of tubercles 110 can result in reduced drag, increased lift, reduced stall speed, increased efficiency, increased lifting capacity and/or increased lifting capacity in high density altitude air.

Each tubercle 110 can house a sensor, an antenna and/or support electronics for at least one sensor. The various sensors, antennae and electronics can be used for horizon scanning, as discussed in further detail below. A tubercle 110, for example, could house a camera (a still camera, a video camera or a combination thereof), a radar transmitter, a radar receiver, a radar transceiver, a sonar transmitter, a sonar receiver, a sonar transceiver, an infrared (IR) receiver, an IR transmitter, an IR transceiver, a radio frequency (RF) transmitter, an RF receiver, a RF transceiver, weather detection equipment, a wind sheer detection system, hyperspectral sensors and imagers, microphones and radio direction finding antennae or any other type of sensor. Various types on antennae can be housed in the tubercles depending upon the respective signal type. Exemplary antennae can include, but are not limited to, monopole or other single line type antennae, dishes, lenses, diffusers or gratings. A tubercle 110 may also house components, subsystems that can affect the weight and balance of a rotor assembly, while in operation.

Each tubercle no is connected to a power and communication bus 120. The power and communication bus 120 can be, for example, a USB bus, a general purpose interface bus (GPIB), a RS232 bus, a RS485 bus, or the power and communication bus 120 may be implemented using Ethernet. The power and communication bus 120 can be implemented using any current format and standard or any future standard. The power and communication bus 120, for example, can use coaxial cable, fiber optic, high power wave guides, simple wire pairs or any other type of electrical or optical connection. The power and communication bus 120 provides a voltage to each tubercle no. The voltage may vary depending upon the voltage requirements of the sensor or electronics housed in each tubercle no. The power and communication bus also allows signals to be passed between tubercles no and to the rotary wing aircraft. The power and communication bus 120, for example, can pass the power and communication signals along a slip ring 130 positioned around a main shaft of the rotary wing aircraft. The slip ring 130 allows for signals to be transferred along a rotating assembly such as the rotor of the rotary wing aircraft.

In other embodiments, for example, the tubercles no can be used as platforms to affect the aerodynamics of the rotors. For example, the tubercles no can intake or exhaust air to affectively change the lift and stall properties of the blades. (In can be used to pump air into and over a rotor which is about to stall.) A tubercle no may also house components, subsystems that can affect the vibrational state of a rotor assembly, while in operation. In other words, a tubercle no can be used to house active and passive vibration dampening subsystems. The tubercles 110 collectively may act as shields or impact energy absorbing devices that will protect the blade structure proper from damage when the rotor strikes some object. Rotor tips are the most damaged portions of helicopters. Properly designed, the tubercle 110 can also act as a replaceable impact shield.

Figure 2:
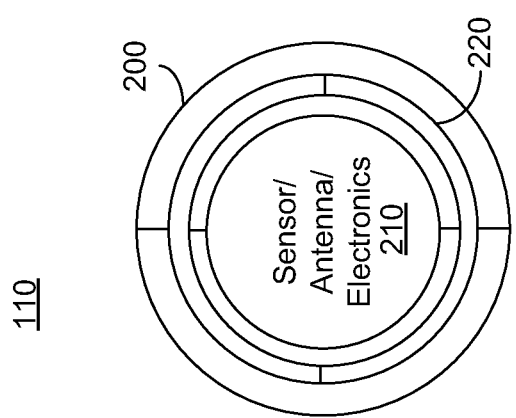
FIG. 2 illustrates an exemplary front view of a tubercle in accordance with an embodiment.

FIG. 2 illustrates an exemplary front view of a tubercle 110. The tubercle no includes an outer dome 200. The dome 200 is environmentally encapsulating, acting as a shield for the sensor/antenna/electronics 210 housed in the tubercle no. While the tubercle no illustrated in FIG. 2 is spherical in shape, the tubercle no need not be spherical or even symmetric. In other embodiments, for example, the tubercle no may be elliptical and or radially asymmetric. Furthermore, the various tubercles no on a rotor may differ in shape.

The dome 200 reduces the risk that the sensor/antenna/electronics 210 housed in the tubercle no will be damaged from air, sand and other debris as the rotor is rotating. The dome 200 could be made from a variety of materials and can be selected based upon the needs of the sensor/antenna/electronics 210 housed in a particular tubercle. For example, if a camera is housed in a tubercle no, the dome 200 could be made of a plastic, glass or other material that minimizes the domes effect upon the optics of the camera. In another embodiment, if the tubercle is housing a radar transceiver, for example, the dome 200 could be made from a radar transparent composite or any other radar transitive material. In one embodiment, the dome 200 may be made from an electrically conductive material to help protect the sensor/antenna/electronics 210 from an electrical discharge due to a built-up static charge. In another embodiment the dome 200 may have an electrically conductive coating placed thereon to help dissipate a static charge.

The tubercle no may also include a gimbal 220. The gimbal 220 include a number of concentric rings connected at alternating points and allows the sensor/antenna/electronics 210 positioned at the center of the gimbal 220 to maintain the same pitch while the rotor blade 100 is rotating or vibrating. A rotary wing aircraft typically alters the pitch of its rotor blades during lift-off and flight depending upon input from a pilot and the forward airspeed. The pitch of the rotor blade 100 could also be affected by wind and other weather conditions. By employing gimbals 220 in tubercles 110, the sensor/antenna/electronics 210 housed in the tubercle 110 are sheltered from the effects of the varying pitch of the rotor blade. In other words, the gimbals 220 reduce the stress realized by the sensor/antenna/electronics 210 and allow the sensors and antennae to receive clearer images and signals by reducing the variation of pitch for the sensor/antenna/electronics 210.

Figure 3:
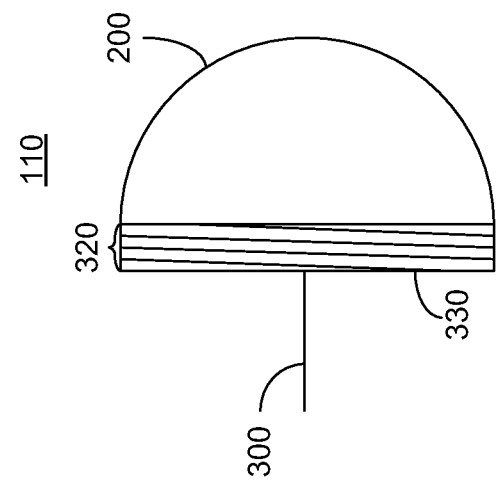
FIG. 3 is a side view of an exemplary tubercle in accordance with an embodiment.

FIG. 3 is a side view of an exemplary tubercle 110. As seen in FIG. 3, the tubercle 110 includes a communication interface 300 for connecting the sensor/antenna/electronics 210 housed in the tubercle to the power and communication bus 120. In one embodiment, for example, the interface 300 is a plug or receptacle (i.e., male or female connector) which connects to a corresponding plug or receptacle in the rotor (not illustrated). In another embodiment the interface 300 can be a series of wires which can be manually connected when the tubercle 110 is installed in the rotor.

The tubercle 110 is connected to the rotor via a removably coupling interface 320. For example, the removably coupling interface 320 illustrated in FIG. 3 includes a threaded element 330 which can be screwed into a corresponding receptor on the rotor. In other embodiments, the removably coupling interface 320 can be used to bolt, screw or bond the tubercles 110 to the rotor blade 100.

The removably coupling interface 320 allows the tubercles 110 to be changed on the rotor blade 100. Accordingly, depending upon the needs of the current mission, the tubercles can be changed such that the necessary sensors, antennae and support electronics are available for the rotary wing aircraft.

Figure 4:
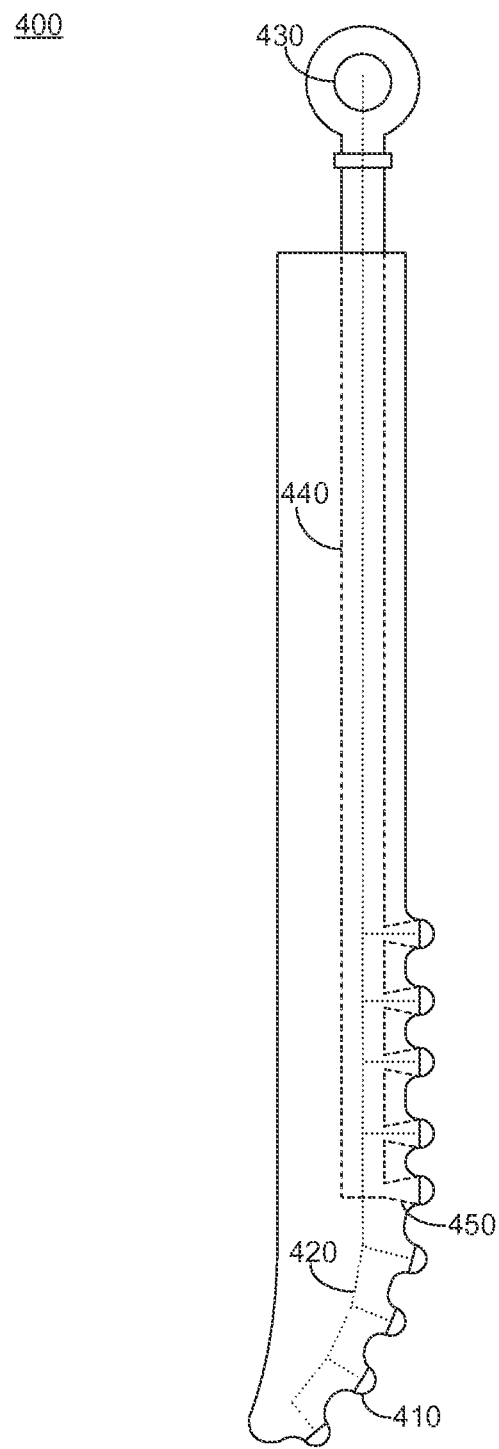
FIG. 4 illustrates another exemplary rotor blade in accordance with an embodiment.

FIG. 4 illustrates another exemplary rotor blade 400 in accordance with an embodiment. The rotor blade 400 includes a series of tubercles 410 on a leading edge of the rotor blade 400. The rotor further includes a power and communication bus 420 for providing power to the tubercles 410 and for providing a communication interface between the tubercles and a rotary wing aircraft. The rotor further includes a slip ring 430 for transferring the power and communication signals from the power and communication bus 420 to the rotary wing aircraft.

The rotor blade 400 further includes a load bearing beam 440. The load bearing beam 440 connects to a vertical mast of a rotary wing aircraft and runs along a substantial length of the rotor blade 400. The load bearing beam can be a box beam, a tube beam or any other appropriate shape. The load bearing beam 440 may be any prismatic shape as long as the material in the core of the beam has the transmissive properties required for the electromagnetic frequencies being used. The beam's core can be filled with purpose specific material or it may be filled with air.

In this exemplary embodiment, the load bearing beam 440 also acts as a waveguide for an antenna 450 in one or more of the tubercles. The antenna can be, for example, a horn or a refractor. By using the load bearing beam 440 as a waveguide, the antenna can broadcast signals with more power.

Figure 5:
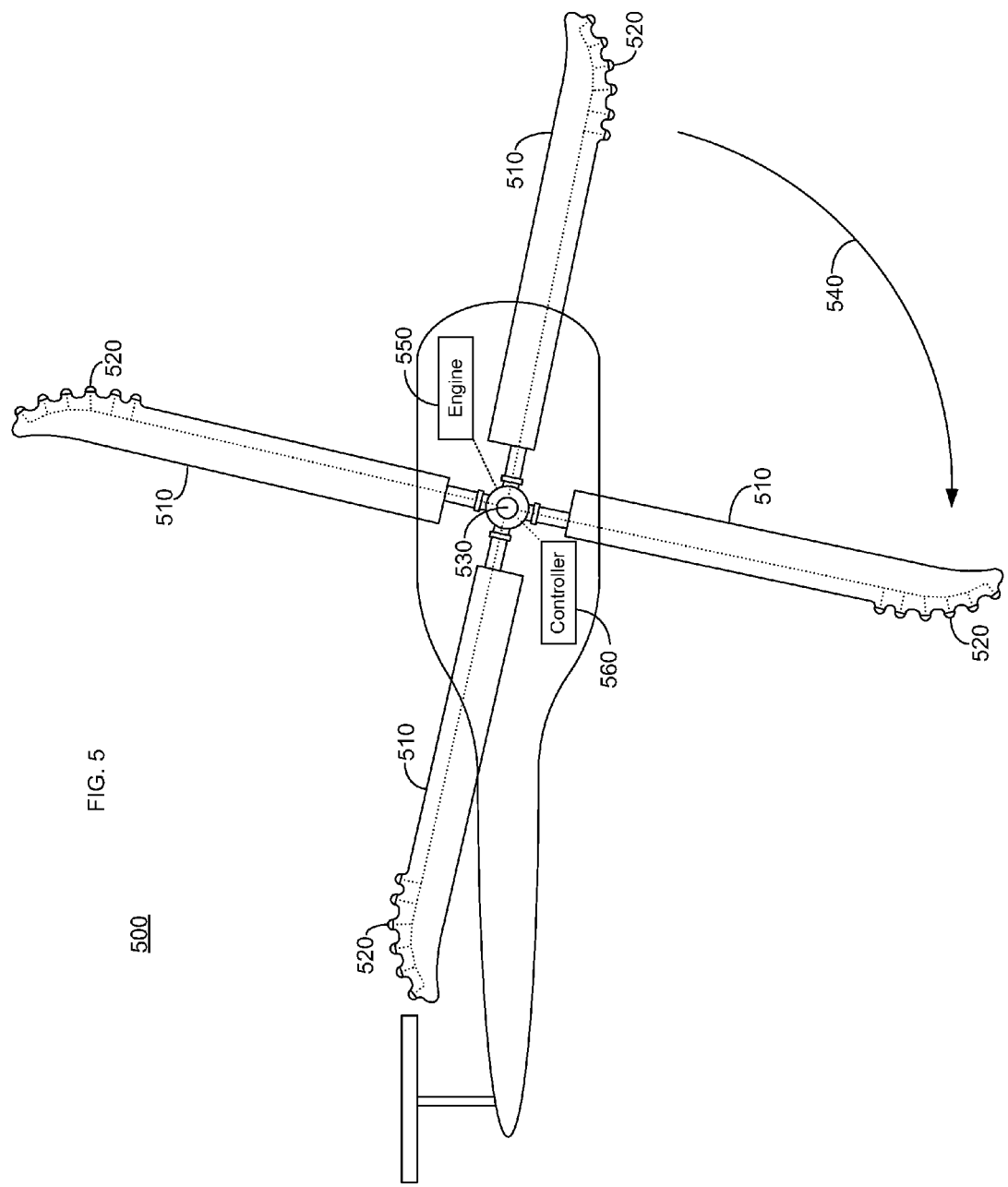
FIG. 5 is an exemplary rotary wing aircraft in accordance with an embodiment.

FIG. 5 is an exemplary rotary wing aircraft 500 in accordance with an embodiment. The rotary wing aircraft 500 illustrated in FIG. 5 is a helicopter, however, the rotary wing aircraft 500 could also be an autogiro, a gyrodyne a rotodyne, a fixed wing rotary hybrid or any other form of rotary wing aircraft. The rotary wing aircraft 500 includes a series of rotor blades 510. While the rotary wing aircraft 500 illustrated in FIG. 5 includes four rotor blades 510, any number of rotor blades 510 can be used. The leading edge of each of the rotor blades 510 includes a plurality of tubercles 520 housing the sensors, antenna and electronics to perform horizon scanning, as discussed above. Each of the rotor blades 510 is connected to a mast 530 of the rotary wing aircraft 500. The mast 530 is connected to an engine 550 which provides rotational force to the mast. As discussed above, the tubercles 520 are positioned on a leading edge of each rotor. The arrow 540 illustrated in FIG. 5 indicates a direction in which the rotors rotate when providing lift.

By incorporating the horizon scanning features into the rotary wing aircraft 500, the rotary wing aircraft 500 can be used to detect objects and possible threats. For example, if a radar system is housed in the tubercles 520, the rotary wing aircraft 500 can determine the range, altitude, direction, or speed of both moving and fixed objects. Further, if the a tubercle 520 is housing weather detecting equipment or wind sheer detection equipment the rotary wing aircraft 500 can be configured to determine weather conditions or detect wind sheer, respectively. As discussed above, the tubercles can be connected to the rotor blade 510 using a removably coupling interface. A controller 560 can be used to control the various sensors, antennae and support electronics housed in the tubercles. Accordingly, the rotary wing aircraft 500 can be reconfigured for any mission depending upon the mission requirements.

As discussed above, the tubercle 520 spacing can be periodic or aperiodic. The spacing can be used to direct a radar beam. For example, if a aperiodic spacing is used, a radar beam can be directed in a different direction by using the interference phenomenon of the emitted electromagnetic waves. This can shape the emitted beams or direct the beam in a direction that is not geometrically normal to the rotor blade of the emitters.

FIG. 6 is a block diagram of a horizon scanning system 600 incorporating sensors 610, antenna 620 and support electronics 630 in tubercles of a rotary wing aircraft. As discussed above, the various sensors 610, antenna 620 and support electronics 630 are connected to a controller 640 through a power communication bus 650. The power and communication signals are transferred from the rotary blades along a mast of the rotor using a slip ring 660.

The controller 640 can include any combination of hardware, software and firmware. In one embodiment, for example, the controller includes a processor. The processor could be a single or multi-core microprocessor, an application specific integrated circuit (ASIC), field programmable gate array (FPGA), or any other type of logic device. The controller 640 can be used to control the various sensors 610, antenna 620 and support electronics 630 and support the horizon scanning function of the rotary wing aircraft.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A rotary wing aircraft having a vertical mast and an engine configured to provide rotational force to the mast and electromagnetic power along the mast, comprising:
    a plurality of rotor blades connected to the vertical mast, each of the plurality of rotor blades further comprising,
        a leading edge;
        a plurality of aperiodically spaced tubercles positioned on the leading edge;
        a plurality of antenna housed within different ones of the plurality tubercles, and
        a load bearing beam that runs along a length of the rotor blade, said load bearing beam providing a waveguide for the plurality of antenna;
    a slip ring that transfers electromagnetic power along the vertical mast to the waveguides and the plurality of antenna,
    wherein the aperiodically spaced antenna are configurable to shape or direct an emitted radar beam.

2. The rotary wing aircraft of claim 1, wherein each of the plurality of tubercles further comprises a gimbal configured to substantially maintain an orientation of the antenna independent of a pitch of the rotor blade.

3. The rotary wing aircraft of claim 1, wherein the plurality of tubercles are removably coupled to the rotor blade.

4. A rotor, comprising:
    a blade having a leading edge;
    a plurality of aperiodically spaced tubercles positioned on the leading edge;
    a plurality of antenna housed within different ones of the plurality of tubercles; and
    a load bearing beam that runs along a length of the rotor blade, said load bearing beam providing a waveguide to transfer electromagnetic power to and from the plurality of antenna,
    wherein the aperiodically spaced antenna are configurable to shape or direct an emitted radar beam.

5. The rotor of claim 4, wherein the plurality of tubercles each further comprise a gimbal configured to substantially maintain an orientation of the antenna independent of a pitch of the rotor.

6. The rotor of claim 4, wherein the plurality of tubercles are removably coupled to the rotor.

7. A horizon scanning system, comprising:
    a rotary wing aircraft comprising:
        a vertical mast;
        a plurality of rotor blades connected to the vertical mast, each of the plurality of rotor blades further comprising:
            a leading edge;
            a plurality of aperiodically spaced tubercles positioned on the leading edge;
            a plurality of antenna housed within different ones of the plurality tubercles; and
            a load bearing beam that runs along a length of the rotor blade, said load bearing beam providing a waveguide for the plurality of antenna;
        a slip ring that transfers electromagnetic power along the vertical mast to the waveguides and the plurality of antenna,
        wherein the aperiodically spaced antenna are configurable to shape or direct an emitted radar beam.

\* \* \* \* \*